Oct. 6, 1936.  E. A. FORD  2,056,394
RECORD CARD CONTROLLED PRINTER
Filed May 7, 1935  7 Sheets-Sheet 1

INVENTOR.
Eugene A. Ford
BY
ATTORNEYS.

Oct. 6, 1936.  E. A. FORD  2,056,394
RECORD CARD CONTROLLED PRINTER
Filed May 7, 1935   7 Sheets-Sheet 3

INVENTOR.
Eugene A. Ford
BY
ATTORNEYS.

Oct. 6, 1936.  E. A. FORD  2,056,394
RECORD CARD CONTROLLED PRINTER
Filed May 7, 1935  7 Sheets-Sheet 5

INVENTOR.
Eugene A. Ford
BY
ATTORNEYS.

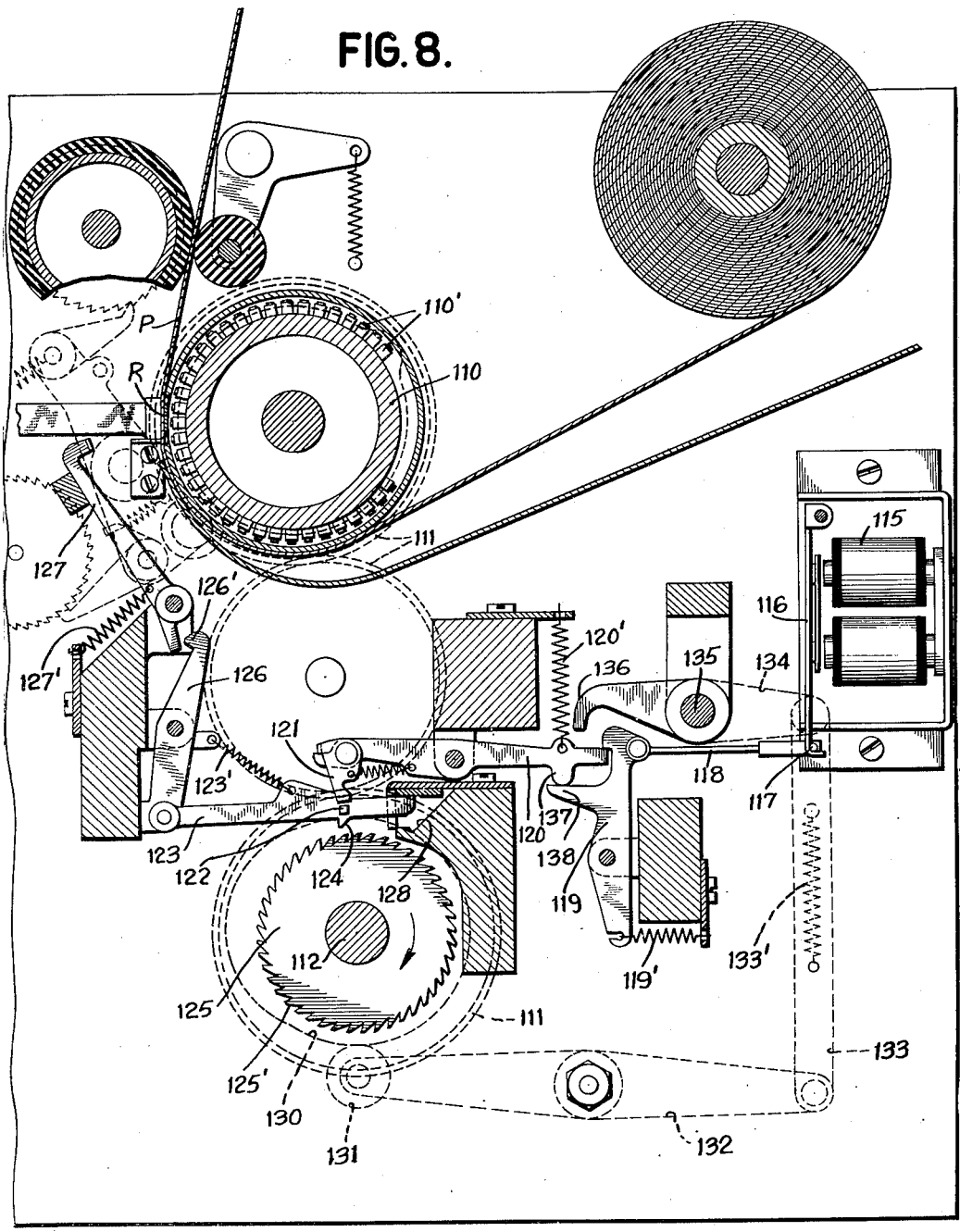

Oct. 6, 1936. E. A. FORD 2,056,394
RECORD CARD CONTROLLED PRINTER
Filed May 7, 1935 7 Sheets-Sheet 7
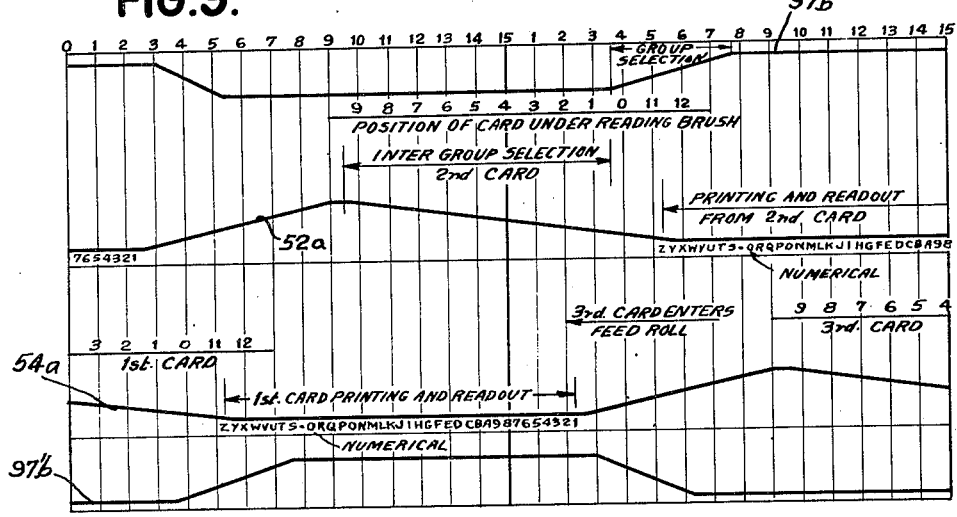
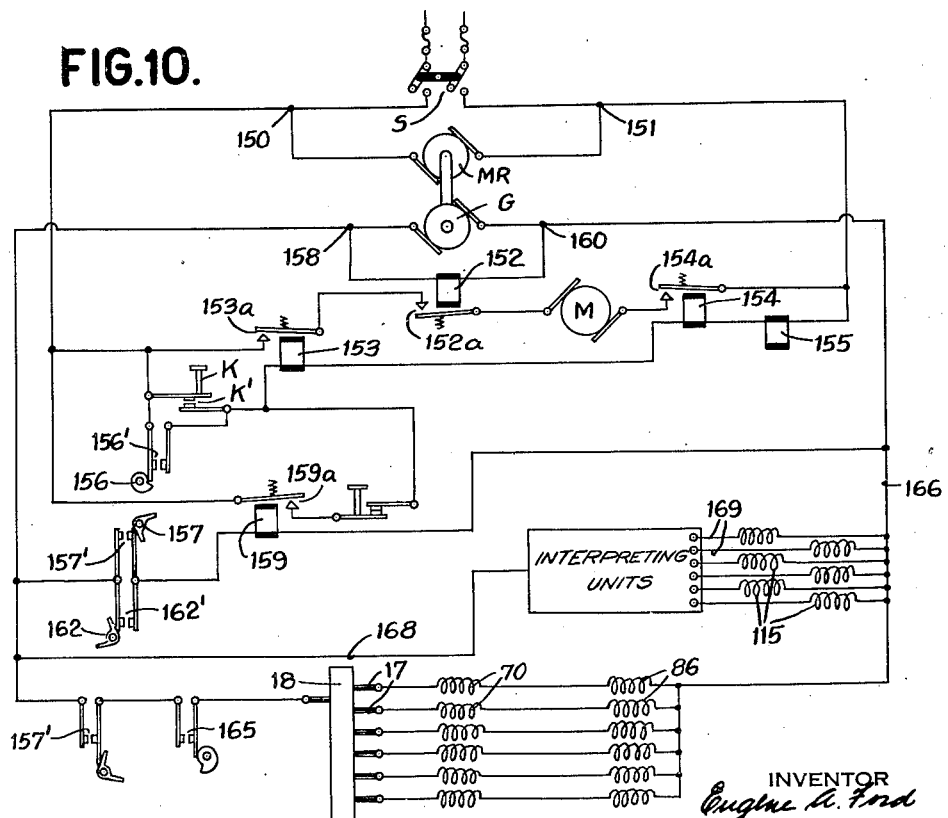

Patented Oct. 6, 1936

2,056,394

UNITED STATES PATENT OFFICE 2,056,394

RECORD CARD CONTROLLED PRINTER

Eugene A. Ford, Scarsdale, N. Y., assignor to International Business Machines Corporation, New York, N. Y., a corporation of New York Application May 7, 1935, Serial No. 20,273

36 Claims. (Cl. 101—93)

This case relates to printing means controlled by perforated record cards.

The object of the invention is to provide improved means for converting combinational or single point representations of items on a card into single differentially timed equivalents for controlling printing means or the like to manifest the items.

Further, the object is to provide an electrical decoder controlled by a single card analyzing brush to convert the coded representations on the cards into single point equivalents.

Another object is to provide group and intergroup units in the decoder respectively controlled by group and intergroup characteristics of an item to read out the combined characteristics as a singly characterized equivalent.

Other objects will appear from the specification and drawings, wherein:

Fig. 8 is a vertical sectional view through the printing section.

Fig. 9 is a timing diagram of two machine cycles, and

Fig. 10 is a circuit diagram.

Figure 7:
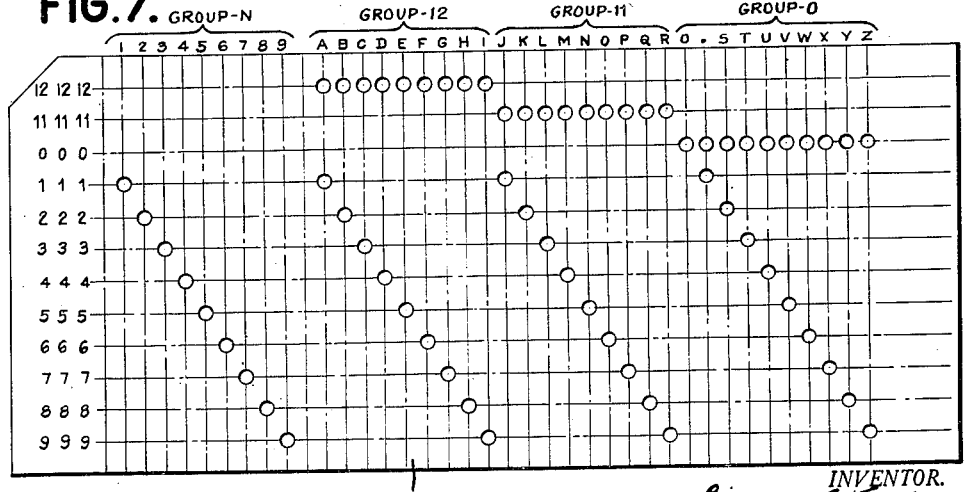
Fig. 7 shows the card perforated to indicate the item-designating code.

The record card T is variously perforated in parallel columns to represent numbers or letters or any other desired items according to a selected code. Numbers are represented by single perforations in a column and other items by a combination of perforations in a column. The items are divided for the purpose of coded representation into four groups. Common to the four groups are index point positions 1 to 9 of a column. These common points may be considered the intergroup characteristics of the items. To distinguish the items further, their intergroup characteristics are supplemented by group characteristics. As indicated in Fig. 7, numbers 1 to 9 are respectively represented by single perforations in the common intergroup positions 1 to 9 and form the numerical group which may be termed group —$n$. The group characteristic of group —$n$ may be considered the blank or dead portion of a card column in positions 0, 11, and 12 which are above the 1 position. Letters A to I are respectively represented by common intergroup points 1 to 9 plus a group characterizing 12 perforation and form group —12; letters J to R are respectively represented by common points 1 to 9 plus the group characterizing 11 perforation and constitute group —11; the period and letters S to Z are respectively represented by perforations in intergroup positions 1 to 9 plus a group characterizing 0 perforation and form group —0. Zero, 0, may also be considered as in group —0 and is represented by a single perforation in 0 position.

The scheme of operation of the machine utilizes the grouping of the items and their distinguishing intergroup and group characteristics. According to this scheme, a card analyzer reads the intergroup and group characteristics of an item, a decoder or translator receives the combination of characteristics of the analysis and reads out the combination of characteristics as a single characterized equivalent to cause a printing mechanism to print the item.

In detail, the machine includes horizontal picker shaft 10 (Fig. 1) driven in the usual manner through a clutch (not shown) from a motor M (see circuit diagram, Fig. 10). Shaft 10 rigidly carries cams 11 contacting pivoted arms 12 connected at the upper ends to pickers 13. Each revolution of cams 11 rocks arms 12 counterclockwise (Fig. 11) against resistance of springs 14 to cause pickers 13 to feed the bottom card of a stack of cards T in hopper 15 out of the hopper into the grip of feed rolls 16. The latter advance the card to the single analyzing station containing the analyzing or sensing brushes 17, one for each card column, as is usual, and the contact roller 18 common to the brushes. The brushes successively sense the index point positions 9 to 12 of each card column while the card is in continuous motion. As the card emerges from the analyzing station it is successively seized by feed rolls 19 and 20 and ejected into the delivery chute 21.

Geared one-to-one with shaft 10, through gearing 22, is a vertical shaft 23 which at the lower end is geared one-to-two with horizontal shaft 24 of the translating, interpreting, or decoding section.

Referring to Figs. 2 to 6, the decoding section comprises a plurality of pairs of commutator units $a$ and $a'$, each pair related to a single analyzing brush 17, and thereby to a single card column, to be positioned according to the intergroup analysis or reading of intergroup positions 9 to 1. Units $a$ and $a'$ are controlled by analysis of alternate cards. Thus, the first card of a series controls units $a$, the second controls units $a'$, the third controls units $a$ and so on.

Each unit $a$ comprises disk 25 rigidly carried by a collar 26 (Fig. 2) rotatably mounted on shaft 24. Engaging the flat sides of collar 26 and the disk 25 is a friction washer 27 of insulating material freely rotatably carried by shaft 24 and held against movement axially of the shaft between collar 26 and a bushing 28 on the shaft. Bushing 28 is of insulating material and mounts a diametrically extending contact arm 30. Both the bushing and the contact arm are commonly pinned to shaft 24 for rotation therewith by a pin 29 of insulating material. Between arm 30 and washer 27 are disposed a disk 31 freely surrounding bushing 28 and a spring washer 32 for urging disk 31 against washer 27. Fixed to arm 30 is a pin 33 which extends past the sides of the arm and at one end is received in a hole 34 in disk 31 to connect the latter to arm 30 for common rotation. Rotation of shaft 24 through arm 30 rotates disk 31 which through friction washer 27 releasably couples disk 25 to shaft 24 for rotation.

Paired units $a$ and $a'$ are at opposite sides of the same arm 30. Unit $a'$ includes a disk 35 frictionally driven from arm 30 in the same manner as disk 25 of unit $a$ is driven.

Figure 3:
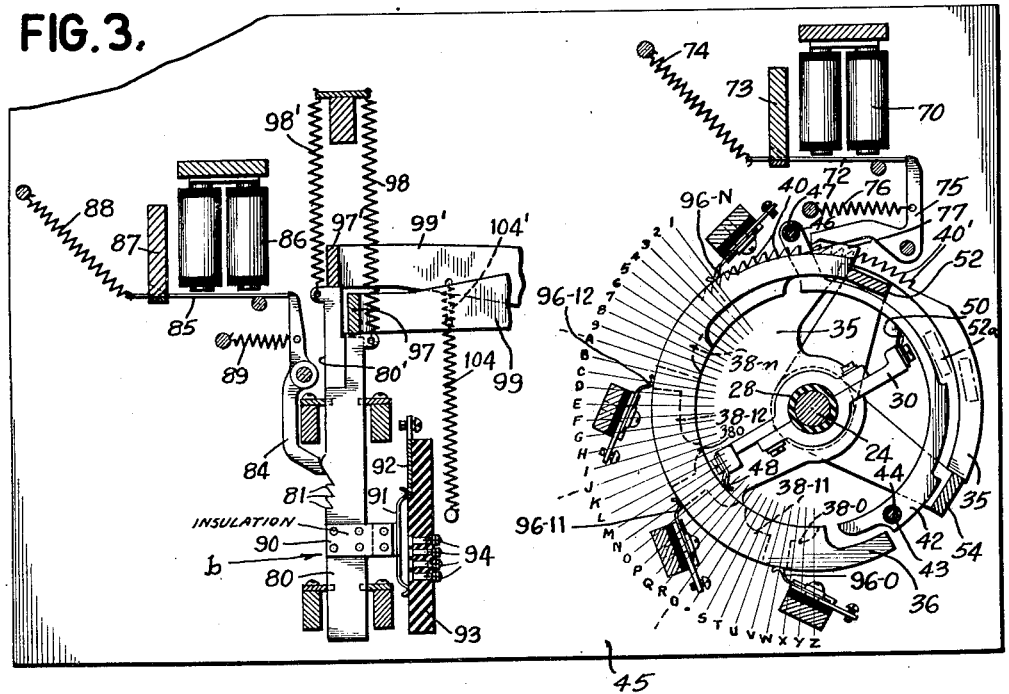
Fig. 3 is a section along lines 3—3 of Fig. 2.
Figure 5:
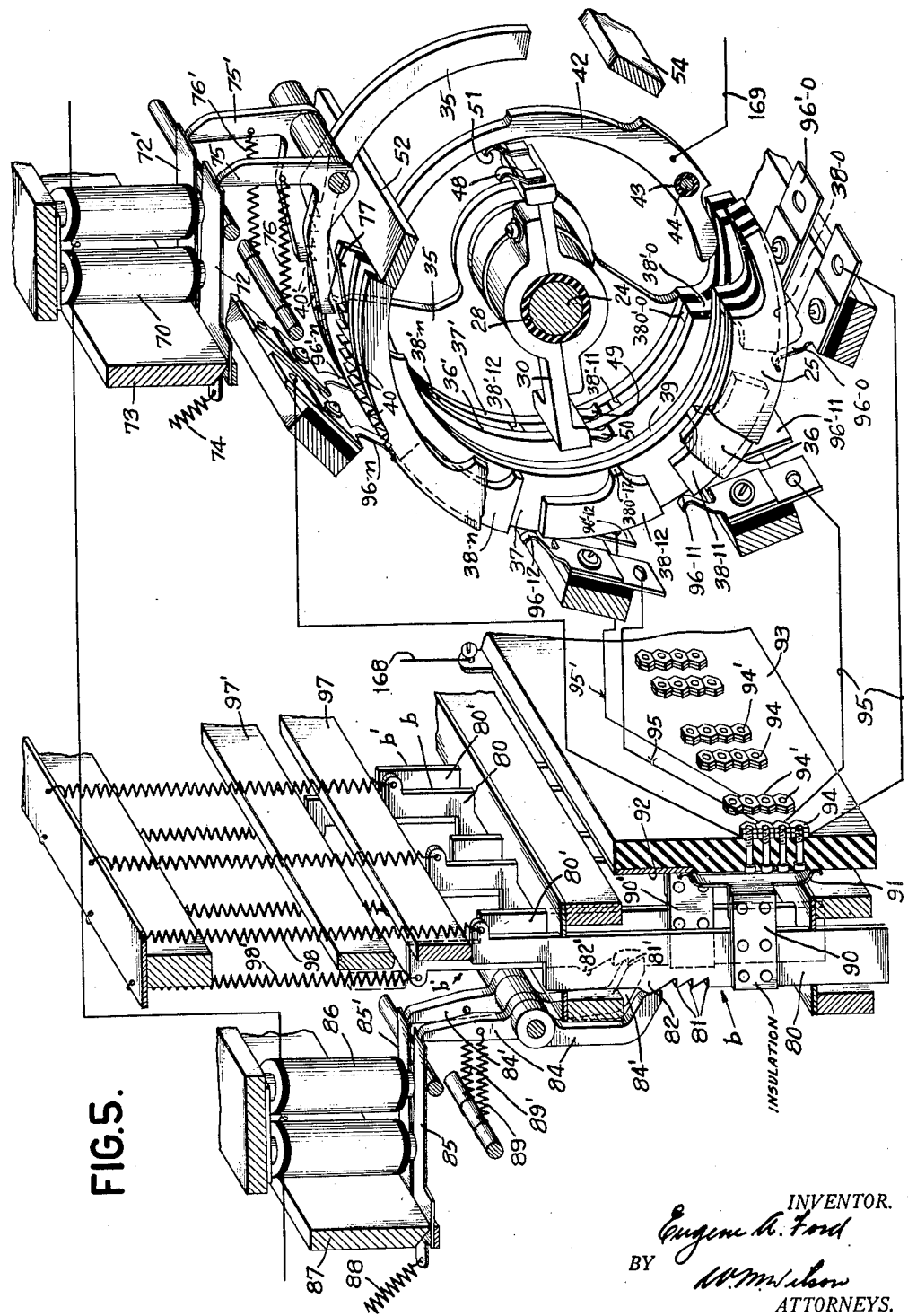
Fig. 5 is a perspective, sectional view of some of the correlated zone and interzone translators of the interpreting section.
Figure 6:
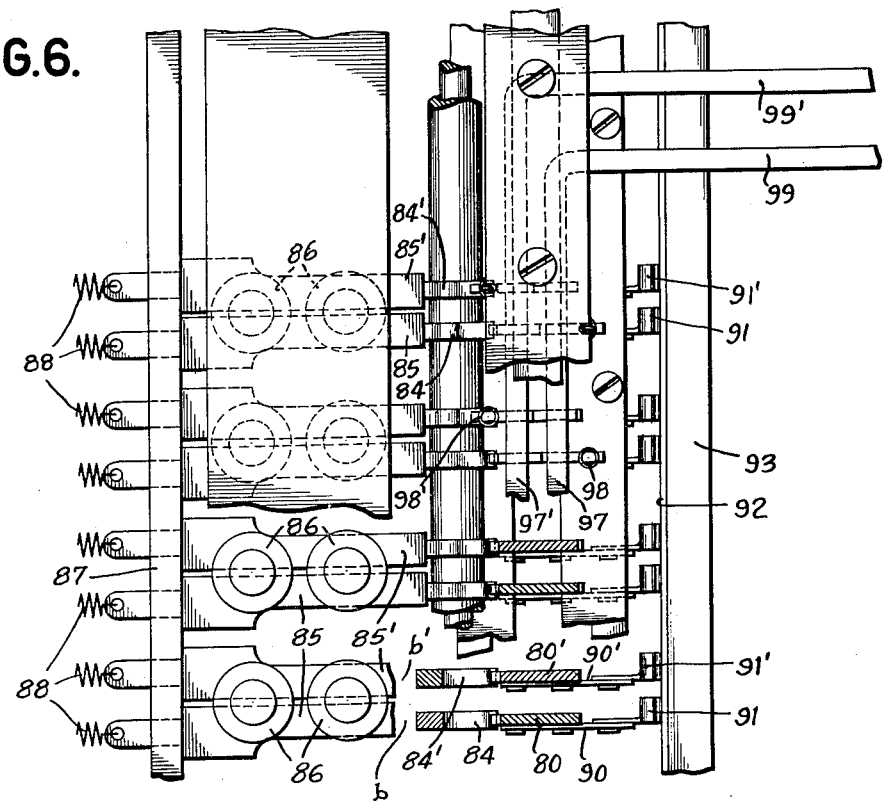
Fig. 6 is a top view, partly sectional, of some of the zone translator units.

Disk 25 of unit $a$ rigidly carries arcuate bars 36 and 37 which are substantially semi-circular ring sections (see Figs. 3 and 5). These bars 36 and 37 are of insulating material and secured between them are commutator contact segments which in clockwise order (Figs. 3 and 5) are 38—0, 38—11, 38—12, and 38—$n$ respectively common to item groups —0, 11, 12 and $n$. Also secured to one side of bar 37 is a similarly shaped bar 39 the upper part of which is provided with ten ratchet teeth 40 (Figs. 3 and 5) forming eleven tooth notches, one for each of designation positions 0 to 9, 11.

In unit $a'$, disk 35 is itself formed with ten teeth 40'. Similarly to disk 25 of unit $a$, disk 35 of unit $a'$ also carries ring-section bars 36', 37', and group segments 38'—0, 11, 12, and $n$.

Located centrally between a pair of units $a$ and $a'$ is a common return ring section or bar 42 which at its lower end is mounted on an insulating sleeve 43 fitting on a rod 44 carried by side frame plates 45 and at its upper end is bent upwardly to be mounted on an insulating sleeve 46 surrounding a rod 47 carried by the side frame plates. The sleeves 43 and 46 are suitably grooved to prevent movement of the ring sections longitudinally of the sleeves. Any other suitable means for rigidly mounting the ring sections 42 to the frame may be used.

Contact arm 30 has four leaf spring feelers 48, 49, 50, and 51. Feelers 48 and 51 are diametrically opposite feelers 49 and 50. Feelers 48 and 49 are respectively in the axially spaced planes of contact segments 38 and 38' while feelers 50 and 51 are in a common plane with the return bar 42. During one half a revolution of shaft 24, feeler 48 will be moving along segments 38 while feeler 50 is wiping return bar 42. At the same time, feeler 49 will be moving freely in space along a path diametrically opposite segments 38' while feeler 51 will be moving freely in a plane between units $a$ and $a'$ and along a path diametrically opposite return bar 42. During the next half of the revolution, feelers 48 and 50 will be, respectively, diametrically opposite segments 38 and bar 42 while feelers 49 and 51 will be respectively engaging feelers 38' and bar 42.

Each revolution of picker shaft 10 feeds a card T out of hopper 15 and may be taken as a machine cycle. Shaft 23 geared one-to-one with shaft 10 also makes one revolution for each machine cycle while shaft 24 of the interpreting section being geared one-to-two with shaft 23 makes one-half a revolution to each revolution of shaft 23. It follows that within a period substantially equal to a machine cycle, segments 38 of units $a$ are connected through feelers 48 and 50 to return bar 42 while within the next period substantially equal to a machine cycle, segments 38' of units $a'$ are connected by feelers 49 and 51 to the common return bar. Through these connections, the segments are read out according to a complete analysis of the group and intergroup characteristics of an item. The read-out periods of the units $a$ and $a'$ do not occur concurrently with the machine cycles but are offset therefrom, as will be indicated later.

The units $a$ and $a'$ are normally restrained from rotating with shaft 24 by a pair of bail bars 52 and 54, respectively, which extend parallel to shaft 24. Bar 52 normally engages the upper transverse edge of the disks 25 of units $a$ while bar 54 normally engages the right hand transverse edge of disks 35 of units $a'$. Bar 52 has arms 55 and 56 for rotatably mounting the bail on shaft 24, arm 56 being in the form of a bell crank lever with part 56' (Fig. 4) slotted at its free end to coact with the rounded end of a branch 57 of a lever 58 freely rotatably suspended by a stationary cross rod 59. The lower portion of lever 58 is formed with another branch 57' having a follower roller 60 coacting with a cam disk 62 rigidly secured to shaft 24. Spring 63 (Fig. 4) connected to the upper end of lever 58 holds roller 60 in engagement with cam disk 62 and each revolution of the latter disk imparts one oscillation to lever 58 which through its branch 57 in turn oscillates arm 56 and bail bar 52.

Similarly, bail bar 54 is rotatably mounted on shaft 24 and its right hand mounting arm 64 is in the form of a bell crank with part 64' coacting with a branch 65 of a lever 66 hung from rod 59. Branch 65' of lever 66 has a follower roller 67 held against a cam disk 68 on shaft 24 by a spring 69 (Fig. 4) connected to the upper end of lever 66 and each revolution of disk 68 oscillates bail bar 54.

Cam disks 62 and 68 are similarly shaped with the high and low points of one cam being diametrically opposite the high and low points of the other cam. Accordingly in one revolution of shaft 24, bar 52 will be first moved clockwise (Fig. 3) then returned counterclockwise while bar 54 will be first turned counterclockwise and then moved clockwise.

In short, bars 52 and 54 move through their clockwise strokes during alternate semi-revolutions of shaft 24. During clockwise movement of bar 52 or 54, units $a$ and $a'$ follow their respective bars in the same direction until differentially arrested under control of the analysis by brushes 17 of intergroup characteristics.

Whenever a brush 17 senses a card perforation, it momentarily energizes an associated intergroup control magnet 70. There is one magnet 70 to each pair of units $a$ and $a'$ and therefore to each card column and its sensing brush. Energization of magnet 70 lifts its armatures 72 and 72', independently mounted on bar 73, against resistance of springs 74. The armatures thereby unlatch bell crank pawls 75 and 75' which coact with teeth 40 and 40', respectively, of units $a$ and $a'$. When a pawl 75 or 75' is unlatched, it is rocked counterclockwise (Fig. 5) by its respective spring 76 or 76' to engage a tooth 40 or 40' and arrest the units $a$ or $a'$ in differential position dependent on the time of energization of magnet 70.

The timing diagram, Fig. 9, illustrates two cycles during which operations take place under control of three cards of a series of cards passing through the machine.

Each machine cycle is divided, for convenience, into fifteen equal cycle points. At the beginning of the first illustrated cycle point, the second card is engaged by pickers 13 and during the next two cycle points fed into the grip of feed rolls 16. By the end of the ninth cycle point, the leading edge of the card enters the analyzer (brushes 17 and contact roll 18).

The movement of bail bar 52 is illustrated by graph line 52a. As indicated by this graph line, at the beginning of the cycle, bar 52 is dwelling in its lowest position. While the card is being moved to the analyzer, bar 52 rises and reaches its upper limit at the same time that the card enters the analyzer. As a result, all the units $a$ are then in their retracted, home, positions shown in Fig. 3. In these retracted positions, pawls 75 are sitting on restoring lugs 77 of toothed bars 39.

One-third of a cycle point before the 9 index point positions of the card columns reach analyzing brushes 17, bar 52 begins to move down and units $a$ follow clockwise (Fig. 5) under the frictional driving force of shaft 24. As units $a$ move clockwise, lugs 77 depart from pawls 75 and when the 9 index point position of the card reaches the analyzer, the pawls are free to rock into engagement with teeth 40 should they be released by magnets 70. The bar continues to move downwardly an equal differential distance each cycle point and in synchronism with the analysis of successive intergroup index point positions 9 to 1 by the analyzer. Teeth 40 are so proportioned as to traverse the nose of pawl 75 in step with the travel of an index point position past its sensing brush 17. When the brush senses a perforation in any intergroup positions 9 to 1 of a column, it immediately energizes associated magnet 70 to release armature 72 from pawl 75 and permit the latter to rock into engagement with the tooth corresponding to the index point position in which the perforation occurs. The unit $a$ of said column is thereby arrested by analysis of points 9 to 1 of a card in corresponding intergroup differential positions.

Thus, analysis of a 9 perforation controls magnet 70 to cause release of pawl 75 in time to engage the leading, abrupt side of the first tooth 40 or the first notch. analysis of an 8 perforation causes pawl 75 to engage the second tooth notch, and so on.

When the 1 positions of a card pass the analyzer, the intergroup control of units $a$ is completed. Bar 52, however, continues its descent so that if the first perforation sensed is a 0 perforation, the tenth or 0 tooth notch is engaged by pawl 75, and if an 11 perforation is the first sensed then the 11th notch is engaged by pawl 75. The descent of bar 52 is limited to that required for the 11th notch to be engaged by pawl 75 and should there be no perforation in a column, the position of the unit $a$ is its 11th position. As will be brought out later, in the tenth position of unit $a$, only numeral 0 is read out to control printing and in the 11th position of unit $a$ no readout occurs and no printing is effected.

Energization of a magnet 70 is momentary, lasting only while a perforation is under the analyzing brush, but pawl 75 remains in released position after deenergization of the magnet, and its latching armature 72 merely drops down on the top of the released pawl. The pawl is not relatched by its armature latch 72 until return of the associated commutator unit $a$ (counterclockwise, Figs. 3 and 5) to initial or home position (shown in Figs. 3 and 5). During the final increment of this return of units $a$, lugs 77 of their toothed bars 39 positively restore pawls 75 into latching coaction with armatures 72.

When unit $a$ or $a'$ is positioned according to analysis of points 0 to 11 of a card, the segments 38 or 38' of these units take similar, corresponding intergroup positions. Only one of these segments is to be rendered effective to control printing and the selection of the controlling segment is effected according to the analysis of the group characterizing index points 0, 11, and 12, and according to the absence of a perforation in all the latter positions. For this purpose, each pair of units $a$ and $a'$ is correlated to a pair of group selecting commutator units $b$ and $b'$, unit $b$ controlling selection of segments 38 of unit $a$ and unit $b'$ controlling selection of segments 38' of unit $a'$.

Referring to Figs. 3 and 5, units $b$ and $b'$ respectively include vertical, slidably mounted bars 80 and 80', having on their respective left hand edges three teeth 81 and 81' preceded by restoring cam lugs 82 and 82'. In the initial, lowermost positions of bars 80 and 80', restoring lugs 82 and 82' are engaged with the nose ends of pawls 84 and 84'. These pawls are latched by armatures 85 and 85' of a common group read-in magnet 86. The armatures are independently mounted on bar 87 and normally urged away from magnet 86, into latching position, by springs 88.

Attached to the sides of bars 80 and 80' are insulating plates 90 and 90'. Each plate 90 carries a contact bridge 91 for conductively connecting bus bar 92 mounted on insulating panel 93 of the interpreting section to any one of four vertically alined contact points 94 set in said panel.

These contact points of a bar 80 of a unit $b$ are, in ascending order, respectively connected through wires 95 to brushes 96—0, 11, 12, and $n$ respectively wiping segments 38—0, 11, 12, and $n$ of the unit $a$ pertaining to the same card column as the unit $b$. Similarly, each plate 90' carries a contact bridge 91' (Fig. 6) for connecting bus bar 92 to terminal points 94' which through wires 95' are connected to brushes 96'—0, 11, 12, and $n$ coacting with segments 38'—0, 11, 12, and $n$ of the corresponding unit $a'$.

When bars 80 or 80' are at their lower limits, the lower ends of their contact bridges are below the lowest contact point 94 or 94' and engaging the non-conductive face of insulating panel 93. Bars 80 and 80' are respectively held in lower positions by restoring bail bars 97 and 97'. When bail bar 97 rises, springs 98 connected to bars 80 cause the bars to follow until arrested in one of four differential positions, corresponding to the zone characteristics. Similarly, springs 98' cause bars 80' to follow the rise of bail bar 97'.

Figure 2:
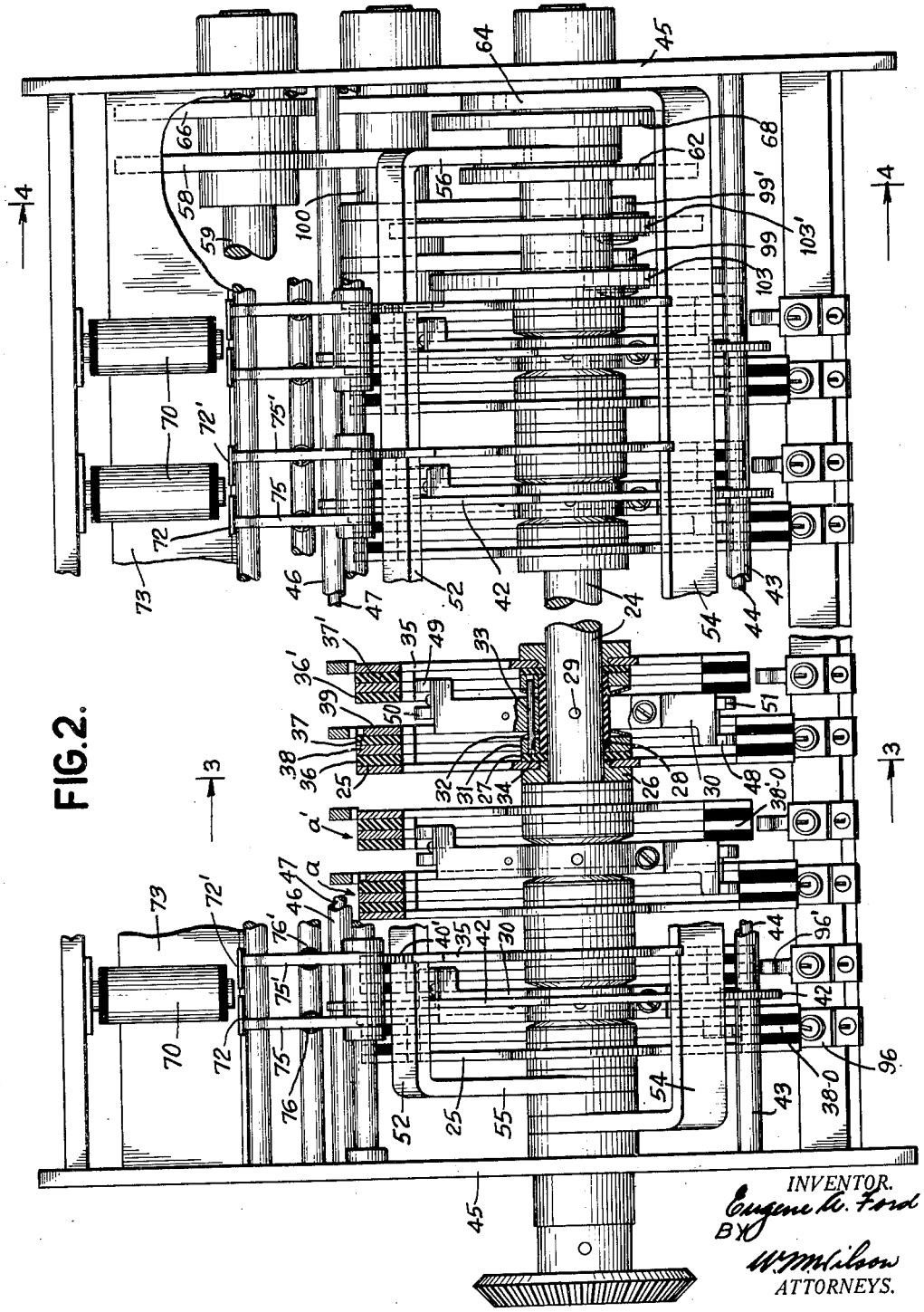
Fig. 2 is an elevation of the interpreting section of the machine, partly in section and with the covering removed.
Figure 4:
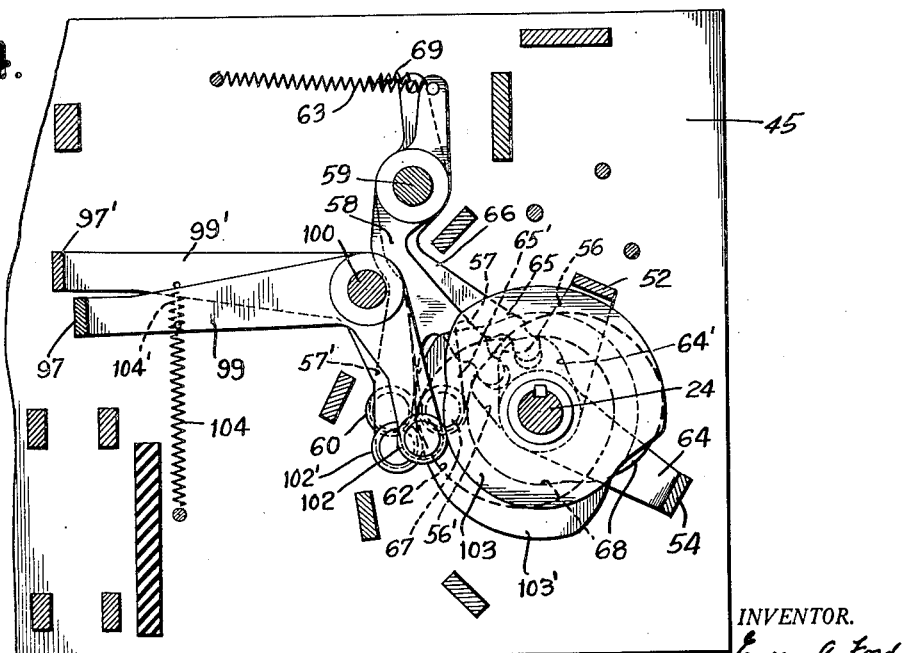
Fig. 4 is a section along lines 4—4 of Fig. 2.

Bail bars 97 and 97' are freely rotatably mounted through their side arms 99 and 99' (only one of each is shown) on a stationary shaft 100 (see Figs. 2 and 4). The right hand arms 99 and 99' (as viewed in Fig. 2) are formed as bell cranks (see Fig. 4) with the lower ends respectively provided with follower rollers 102 and 102' held engaged by springs 104 and 104' with cam disks 103 and 103' on shaft 24. At each revolution of shaft 24, cams 103 and 103' oscillate their associated bail bars 97 and 97'. The cams are similarly shaped with their corresponding portions diametrically opposite. Thus, in a period falling within one-half a revolution of shaft 24, cam 103 raises bar 97 and in the same period, cam 103' permits bar 97' to drop.

In the second half of the revolution, cam 103 permits bar 97 to drop and cam 103' raises bar 97'. Thus, the selecting operations of units $b$ which follow the use of bar 97 occur during one half a revolution of shaft 24 and the selecting operations of units $b'$ following bar 97' occur during the second half of the revolution. Since each semi-revolution of shaft 24 equals a machine cycle in extent, units $b$ and $b'$ may therefore be said to operate similarly during alternate periods spaced apart an interval equal in extent to a machine cycle.

Referring again to the timing diagram, Fig. 9, graph line 97$b$ indicates the movement of bail bar 97. At the beginning of the first illustrated cycle, the bail bar 97 is idling in upper position, then it descends and idles in lower position during the reading of index point positions 9 to 1 by the analyzer and while the units $a$ are being set under control of perforations in the latter positions. About one-third of a cycle before the 0 index position reaches the analyzer, bar 97 starts to rise and units $b$ to follow. The movement of bar 97 is synchronized with the movement of the group characterizing field past the analyzer and teeth 81 pass the pawls 84 in synchronism with the passage of group index point positions 0, 11, and 12 past the analyzing brush 17. The initial movement of bars 80 releases lugs 82 from pawls 84 to allow the latter to move towards teeth 81 should they be unlatched by armatures 85 under control of magnets 86. Thus, if the analyzer senses a perforation in 0 index position, then control magnet 86 will be momentarily energized under control of the analyzers and raise armatures 85 and 85'.

Armature 85 will release pawl 84 and spring 89 will rock the pawl into engagement with the uppermost tooth 81 to arrest the follow-up movement of bar 80. The lower end of contact bridge 91 will thereby be engaged with the lowest of the four terminal points 94 to place in the circuit contact segment 38—0 of the associated unit $a$.

Similarly, if the 11 index point position is perforated, then bar 80 will be arrested by engagement of pawl 84 with the second tooth 81 and bridge 91 will engage the second contact point 94 from the bottom. This will connect contact segment 38—11 into the circuit. In the same manner, a 12 perforation will cause arrest of bar 80 in a position for bridge 91 to engage the third contact point 94 from the bottom to bring segment 38—12 into the circuit. If there is no 0, 11 or 12 perforation, then bar 80 will follow bail bar 97 to its upper limit and bridge 91 will be engaging the top contact point 94 to connect segment 38—$n$ into the circuit.

In the same manner, units $b'$ have been set under control of the first card of the assumed series and will be set under control of the third card to selectively place one of segments 38—0, 11, 12, or $n$ in the readout circuit of the interpreting section.

Each segment 38 is formed along its inner arc with a single contact projection or spot 380. Spots 380—0, 11, 12, and $n$ are respectively on segments 38—0, 11, 12, and $n$ and are successively engaged by feeler 48. Similarly, segments 38'—0, 11, 12, and $n$ have contact spots 380'—0, 11, 12, and $n$ successively engaged by feeler 49.

When units $a$ or $a'$ move one to eleven steps under control of analysis of single column perforations 9 to 0, 11, their contact spots move similar distances. For a 9 perforation, the contact spots will all move one step; for an 8 perforation, they will all move two steps; and so on. Each contact spot therefore has eleven possible positions. The tenth position of only contact spots 380—0 or 380'—0 has any significance for controlling printing while the eleventh positions of all the spots are equally ineffective to control printing. Thus each of the four spots has nine significant positions and the 0 group spot also has a tenth significant position, making a total of thirty-seven significant positions. Since there are thirty-seven items which may be represented on the record card and thirty-seven possible positions of spots 38 or 38', there is thus one contact spot position for each separate item. These different positions and the items to which they correspond are indicated in Fig. 3.

Feelers 48 or 49 which sweep across these thirty-seven possible positions successively encounter the four spots of units $a$ or $a'$ at four of these positions. However, only one segment 38 or 38' has been placed in a readout circuit by the associated group selecting unit $b$ or $b'$ and therefore only one contact spot is capable by its encounter with feeler 48 or 49 of forming a printing control circuit. This encounter takes place when the read-out feeler is at one of the thirty-seven positions and therefore the printing control circuit is read out by the feeler at a time corresponding to the location of the effective position. The travel of the feeler across these thirty-seven positions may be termed the readout travel or range of the feeler.

In the event that a card column does not contain a perforation in positions 9 to 1 but only in the 0 position, then the oscillating unit $a$, for example, will move ten steps. This will carry all the contact segments except the lowest, group —0, segment off their brushes 96. This is because the group —0 segment is longer by one step than the others. Only the group —0 segment will then be capable of connection through its feeler 96 to the associated group selection unit $b$. The analysis of the 0 perforation simultaneously stops the unit $b$ with bridge 91 engaging lowest contact point 94 so that segment 38—0 and spot 380—0 are now potentially effective to complete the readout circuit when feeler 48 reaches the tenth position of its readout range. This position corresponds to a numerical 0 items and therefore as will be later explained, the printing means is controlled by the described readout circuit to print 0.

If the first perforation, of a column, encountered by the analyzer is an 11 perforation, the associated unit $a$, for example, will move eleven steps, or the limit of the clockwise stroke of bar 52. This will bring all the contact segments 38—0, 11, 12, and n off their coacting brushes 96. As a result, even though the unit b of the same column is stopped in its group —11 position by the analysis of the single 11 perforation, thereby bringing brush 96—11 into the circuit, the brush being off its segment 38—11, the latter will be ineffective and no readout circuit will be formed. Failure of a column to contain any perforation will also cause unit a to move eleven steps disengaging all four contact segments 38 from their brushes 96 so that again no readout circuit can be formed.

Fig. 8 shows the printing means which is controlled by the readout circuits. The printing means comprises a continuously rotating drum 110 having a plurality of parallel circumferential columns of type 110'. Each column of type is correlated to one card column by means of the decoder elements related to this card column. There are thirty-seven type in each column, one for each item, and having the same relative relationship as the thirty-seven read-out positions of the contact spots of an oscillating unit. Further, the type of a column pass the printing position in synchronism with the travel of the feeler 48 or 49 past the readout positions. Thus, should a readout circuit be formed as the feeler reaches a certain readout position, the type corresponding to such position will be at printing location and printing thereby will be effected under control of the readout circuit.

Figure 1:
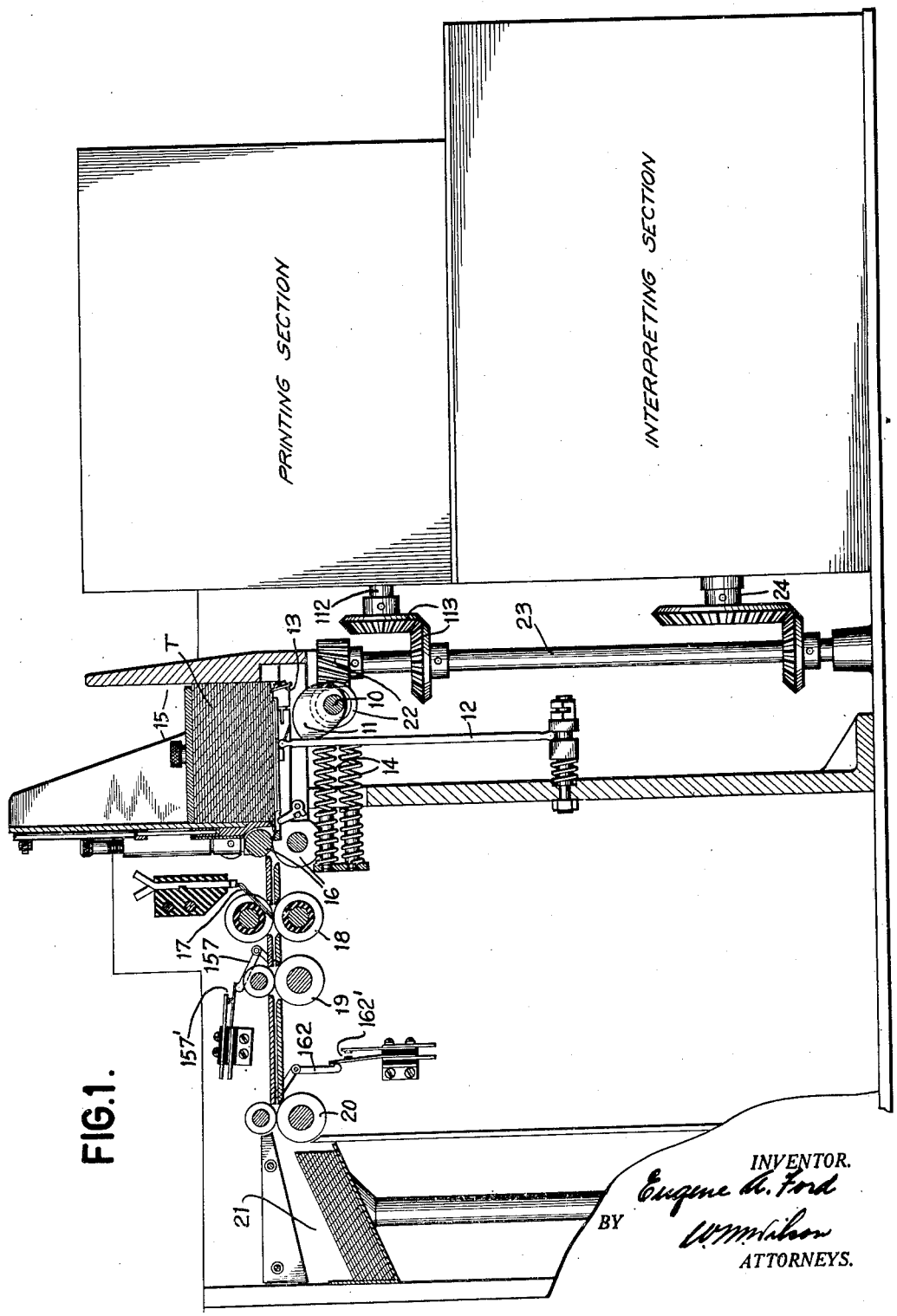
Fig. 1 is a side view of the machine partly in section.

Printing drum 110 is geared one-to-one by gearing 111 with a shaft 112. This shaft extends outside the housing of the printing section, as indicated in Fig. 1 and is driven one-to-one, through bevel gearing 113, by shaft 23. The printing drum therefore makes one revolution each machine cycle. The thirty-seven type 110' of a column of type therefore move past printing location during a period equal in extent to a machine cycle. The readout operation of a feeler during which it traverses the thirty-seven read-out positions of the contact spots occurs during one-half a revolution of the feeler and therefore during a period equal in extent to a machine cycle and equal to that of the printing drum cycle.

Thus, the feeler and printing drum move in synchronism and the feeler traverses the readout positions in step with the travel of type 110' past the printing location.

Each column of type 110' prints under control of a magnet 115. Armature lever 116 of this magnet is hooked at its lower end to engage a pin 117 at the right end (Fig. 8) of a link 118 which is pivoted at the left to a latch lever 119. The lever 119 latches down the right end of a lever 120 which at the opposite end pivotally carries a by-pass member 121. The lower end of this member is above a lug 122 of a link 123, the lower edge of which has a ratchet tooth 124 above the ratchet teeth 125' of a disk 125 fast to shaft 112. The ratchet teeth 125' are spaced the same angular distances apart as type 110' and pass tooth 124 in synchronism with the travel of the type past the printing position.

Link 123 is pivoted to a lever 126 which has a lug 126' at its upper end in position to strike the tail of a printing hammer 127.

When a readout circuit is formed, magnet 115 is energized and attracts its armature 116 which through link 118 rocks lever 119 clockwise against resistance of a spring 119'. The lever 119 unlatches lever 120 to permit spring 120' to rock the latter lever counterclockwise. As lever 120 moves in this direction, member 121 strikes lug 122 and forces link 123 downwardly against resistance of spring 123'. The ratchet tooth 124 is thereby engaged with a tooth 125' of disk 125 and the rotation of the latter positively actuates link 123 to the right also against resistance of spring 123'.

Movement of link 123 to the right rocks lever 126 counterclockwise and the lug 126' strikes hammer 127 to rock the latter clockwise against resistance of a spring 127'. The hammer is thus impelled against the paper P to cause the type 110' then at printing position to print on the paper through ink ribbon R.

As link 123 was drawn to the right by disk 125, its right end rode up on an inclined surface 128 which cammed the link upwardly to positively disengage it from disk 125.

Shaft 112 has a cam 130 engaged by a follower roller 131 on a lever 132 connected by link 133 to an arm 134 fast to a shaft 135. This shaft has a plurality of arms 136 one above each lever 120. After the readout period and while the blank portion of a printing drum is travelling past printing position, cam 130 rocks lever 132 counterclockwise to raise link 133 against resistance of a spring 133'. The link rocks arm 134 and shaft 135 counterclockwise bringing arms 136 down against the rear ends of lever 120 to rock the latter clockwise. As the levers rock in this direction, lugs 137 thereof engage extensions 138 of levers 119 to positively replace the latter in initial latching position. The parts are thus restored to their initial positions.

The paper and ink ribbon feeding means need not be explained herein as any such suitable means may be employed.

*Summary*

Referring to Fig. 10, the circuit diagram, switch S when closed establishes a circuit through motor MR which is across terminals 150 and 151. Motor MR drives generator G. When the generator furnishes current at the desired voltage, then relay 152 is energized to close contacts 152a in the circuit of driving motor M.

Now, with a stack of cards, to be operated on, in supply hopper 15 (see Fig. 1), the operator depresses start key K to close start key contacts K'. As a result, a circuit is formed from terminal 150, through contacts K', relays 153 and 154, and clutch magnet 155, to terminal 151.

Relays 153 and 154 respectively close contacts 153a and 154a which are at opposite sides of the line of drive motor M and as a result a circuit is completed through motor M. Clutch magnet 155 also having been energized, couples the various driven shafts of the machine to motor M through the usual, one-revolution, tabulating machine clutch.

At the 1 point of the cycle, cam 156 closes cam contacts 156' which by-pass start key contacts K' so that the start key may now be released. During the first card cycle, picker 13 feeds out the bottom card T. At the 13th point of the cycle, the card reaches the first card lever 157, closing card lever contacts 157' (see Figs. 1 and 10). Closing of contacts 157' forms the following circuit:

From terminal 158 at one side of the subsidiary line, through card lever contacts 157' and a relay 159 to terminal 160 at the opposite side of the line.

Energization of relay 159 closes contacts 159a to form a by-pass path shunting both the start key contacts K' and the cam contacts 156'. The first card has closed the first card lever contacts 157' at the 13th point of the first cycle and at the 11th point of the following, second, cycle, it leaves the first card lever and contacts 157' open. But at the 11th point of the second cycle, the first card reaches the second card lever 162 to close contacts 162'. The second card lever contacts open at the 9th point of the third cycle. Thus, as long as cards continue to feed, the first card lever contacts are open only between the 11th and 13th points of a cycle while the second card lever contacts are open only between the 9th and 11th points of a cycle. As indicated in the circuit diagram, the card lever contacts 162' are in parallel with card lever contacts 157' and as at least one of the contacts are closed sometime during the cycle, when cards are feeding the by-pass path shunting cam contacts 156' and start key contacts K' remains closed and as a result, relays 153, 154, and clutch magnet 155 remain energized to maintain motor M in operation and coupled to the driven shafts of the machine.

The last card of the stack leaves card lever 162 to open contacts 162' at the 9th point of a cycle. At this time, however, cam contacts 156' are closed so that the circuit through motor M and magnets 153, 154, and 155 is maintained. At the 14th point of the cycle, contacts 156' close and the machine coasts one point to the end of the cycle.

To bring out the operation of the machine specifically, the operations will be briefly followed through three successive cycles, two of which, the second and third, are shown in the timing diagram, Fig. 9. It will be assumed that during the first card cycle, a card T was fed out of the magazine and that it has an E item in the first card column. This item is designated by inter-group perforation 5 and a group perforation 12. It will be further assumed that during this first cycle, bar 54 controlling units $a'$ was started on its upward or counterclockwise stroke. The movement of bar 54 is indicated in Fig. 9 by graph line 54a. During this first card cycle, bar 54 has moved counterclockwise from the full line position shown in Fig. 3 to the dotted line position which is at the limit of its return stroke. One-third of a cycle point before the 9 index point of the first card reaches the analyzing brushes 17, bar 54 starts moving down and units $a'$ follow in synchronism with the travel of card position 9, 8, 7, etc. past the analyzing brushes. When the 5 index point position reaches the analyzers, the brush 17 reading the first column senses a 5 perforation in the first column and as a result, the following analyzing circuit (see Fig. 10) is formed:

*Analyzing circuit.*—From terminal 158, through the first card lever contacts 157', through cam contacts 165, (open between the 7th and 9th cycle points), through common contact roll 18, the first column analyzing brush 17 (engaging the roll 18 through the 5 perforation), intergroup selection magnet 70 of the first column units $a$ and $a'$, group selection magnet 86 of the same column units $b$ and $b'$, and through line 166 to the terminal 160.

The above circuit energizes magnets 70 and 86 but units $b'$ now being in restored position, with restoring bumps 82' engaging pawls 84', the energization of magnet 86 is not effective to release pawl 84 of the first column unit $b'$. Energization of magnet 70 is effective, however, to attract its armature 72', thereby releasing pawl 75' for movement by spring 76' into engagement with the tooth 40' corresponding to the 5 index point position. The unit $b'$ of the first column is thereby arrested in a 5 intergroup position which is shown in Fig. 5.

During the second cycle, the first card of the series of three is still being analyzed by the brushes 17, as indicated in the timing diagram. One-third of a cycle point before the 0 index point position of the card reaches the analyzer, bar 97' starts rising as indicated by its graph line 97'b and units $b'$ follow in synchronism with the feed of the index positions 0, 11, and 12 past the brushes 17. At the sixth point of the second cycle, brush 17 of the first column senses the 12 perforation in the first card column. As a result, an analyzing circuit is formed similarly to the one described above. At this time, energization of first column magnet 70 has no effect on the pawl 75' because the later was previously released when a 5 perforation was sensed by the analyzer and as a result, armature 72' is now resting on top of this pawl 75'.

Now, however, energization of first column magnet 86 is effective to unlatch its pawl 84' for movement by spring 89' into engagement with the bottom tooth 81' of the first column bar 80'. The arrested position of this bar 80' is then as shown in Fig. 5. In this position of the first column bar 80', it places in the readout circuit the commutator segment 38'—12 of the first column $a'$ which was arrested in the 5 intergroup position.

At the fifth point of the second cycle (the first shown in the timing diagram), the readout brushes 49 of the units $a'$ start scanning the thirty-seven possible readout points (see Fig. 3) of the commutator spots 380'—0, 11, 12, and $n$. With unit $a'$ in a 5 position, brush 49 successively engages spot 380'—0 at the V readout point, spot 380'—11 at the N readout point, spot 380'—12 at the E readout point, and spot 380'—$n$ at the 5 readout point. Since neither spots 380'—0, 11, or $n$ have been selected by the unit $b'$, the engagement of these spots by brush 49 will be without effect. However, spot 380'—12 has been selected and therefore when brush 49 reaches the E readout position and engages spot 380'—12, the following readout circuit is completed:

*Readout circuit.*—From terminal 158 (see Fig. 10), through wire 168 (see Fig. 5), bus bar 92, contact bridge 91' (see Fig. 6) carried by bracket 90' of the first column bar 80', the third contact point 94' from the bottom, wire 95', feeler 96'—12, commutator segment 38'—12, spot 380'—12, brush 49, arm 30, brush 51, common contact segment 42 of the first column pair of units $a$ and $a'$, wire 169 (see Figs. 5 and 10), the first column print magnet 115 (Figs. 8 and 10), and through line 166 to terminal 160.

As a result of the above circuit, print magnet 115 is energized to cause the hammer 127 of the first column of type to strike the type lug 110' (of this column) which is then in printing position. Type drum 110 is moving synchronously with contact arm 30 in a manner such that the feeler 49 is scanning the readout points of the various characters in step with the travel past printing position of the type lugs 110' for printing these characters.

When feeler 49 engages spot 380'—12 at the E position to form the above circuit through print magnet 115, type lug 110' bearing legend E is at printing position. As a result, an E will be printed on sheet P (see Fig. 8).

Referring again to the timing diagram, Fig. 9, during the second cycle (the first in the timing diagram), bar 52 starts moving counterclockwise and at the 9th point of this cycle has reached its upper limit, thereby positioning all the units $a$ in their starting positions. One-third of a cycle point before the 9 index point of the second card reaches the brushes, bar 52 starts to descend and units $a$ to follow. Fig. 5 shows the position of one unit $a$ and bar 52 one cycle point after the bar started its descent. At this time, the 8 index point position of the second card is entering the analyzer and the nose of pawl 75 is in position to engage the second tooth 40 which corresponds to an 8 perforation. At this time, too, bar 54 of units $a'$ is idling in lower position and brushes 49 are scanning the readout positions to sense contact spots 380' and have reached the L point of their readout range. Governed by the intergroup perforations in the second card, units $a$ are differentially arrested, this occurring while the brushes 49 of units $a'$ are still scanning the readout range to control printing in accordance with the designations of the first card. During the third cycle, the group selection by units $b$ occurs and the brush 48 scans the readout points to control the printing magnets 115. Also during the third cycle, units $a'$ and $b'$ are restored and under control of the third card repeat evolutions similar to those described with respect to the first and second cards.

It is to be understood that the invention is not limited to the form herein illustrated but that such variations, departures, and changes from the illustrated form of the invention as are derived from the principles of the invention are to be considered as covered by the claims.

I claim:

1. In a machine controlled by record cards bearing items of a group; the combination of printing type for printing said items, a displaceable selector having successive positions of displacement along a given line of travel, each representative of a different item, card-controlled means for displacing the selector to the position corresponding to the item on the controlling card, and cyclically operable means coacting with the selector for selecting one of the type for printing the item represented by the position to which the selector has been displaced.

2. In a machine controlled by record cards bearing items of a group; the combination of a selector common to such group of items and having successive differential positions of displacement, each representative of a different item in the group, card-controlled means for causing the selector to assume the position corresponding to the item in the group represented on the controlling card, and timed means for reading out the position of the selector as a timed equivalent of the latter item.

3. In a machine controlled by record cards bearing items of a group; the combination of a selector common to such group of items and having successive differential positions of displacement, each corresponding to a different item in the latter group, card-controlled means for moving the selector to one of said positions corresponding to the item represented on the controlling card, a timed member for reading out the position of the selector as a timed equivalent of the latter item, and selectively operable means synchronously timed with the aforesaid member and controlled by the coaction of the member and the selector for operation according to the selector position read out by said member.

4. In a machine controlled by record cards bearing items of different groups; the combination of a plurality of selector devices, each common to a different one of such groups of items, each selector device being differentially settable, each setting of a device representing a different item in its corresponding group, card analyzing means, means controlled thereby according to the analyzed item for selecting only one of said devices for operation and for selecting the setting of the selected device, and means coacting with the selected device while the latter is at rest for reading out the item represented by its setting.

5. In a machine controlled by record cards bearing items of different groups, each item having a group characterizing portion and an intergroup characterizing portion; the combination of a plurality of selectors, each common to a different one of such groups of items, each having successive positions of displacement, each position of a selector corresponding to a different item in the group of items common to the latter selector, card-controlled means for commonly setting the selectors in similar positions within their own groups of positions according to the intergroup characterizing portion of an item on the controlling card, card-controlled means for also selecting one of the selectors for operation according to the group characterizing portion of the item on the controlling card, and means for reading out the latter selector according to its position of displacement and according to the group related to the latter selector.

6. A machine operating on record cards bearing combinational designations of items of different groups; the combination of a plurality of selector devices, each common to a different one of such groups, card-controlled means for selecting one of said devices for effective operation according to one designation portion of the item on the controlling card, card-controlled means for also reading into the selected device the remaining portion of the designation of the latter item, and means for successively traversing the different devices and rendered effective upon traversing the selected device and in accordance with the designation portion read into the latter for reading out the combinational designation as a single point equivalent.

7. In a machine controlled by record cards bearing items of a group; the combination of a commutator member corresponding to such group and having different settings, each representative of a different item in the group, card-controlled means for placing said member in a read-out circuit, card-controlled means for also setting the member according to the item on the controlling card, cyclically operable means cooperating with said member for completing the read-out circuit, and selectively operable means controlled by the read-out circuit according to the item represented by the setting of the commutator member.

8. In a machine controlled by record cards bearing items of a group; the combination of a commutator member corresponding to such group and having successive differential positions of displacement, each representative of one item of the group, card-controlled means for displacing said member to one of said positions according to the item on the controlling card, timed means having a path of travel including all the positions of said member, a read-out circuit formed by coaction of the timed means with said member at a point of said travel corresponding to the position to which the member has been displaced, and recording means movable synchronously with the timed means and controlled by the read-out circuit according to the position of said member.

9. In a machine controlled by record cards having columns in which certain items may be designated by a single perforation, the position of which in the column determines its value; the combination of means for analyzing the cards, a terminal differentially positioned under control of the analyzing means according to the value of the perforation sensed thereby, a read-out circuit, means for connecting said terminal into said circuit only upon the failure of the analyzing means to sense more than a single perforation in a column, means coacting with the terminal after it has been connected into the circuit for completing the circuit, and means selectively controlled by the circuit according to the position of the terminal.

10. In a machine controlled by record cards bearing a group of item designations; the combination of printing type, each for printing one of said items, a circuit for selecting said type for operation, a terminal in said circuit having different positions, each corresponding to one of the items of said group, means controlled by an item designation of said group on a card for moving the terminal to a position corresponding to the item, and a contactor having a timed travel for coacting with said terminal at a differential point of said travel dependent on the position of the terminal for completing said circuit to select one of said type for printing the controlling item.

11. In a machine controlled by records having different groups of items; the combination of a member having a range of travel divided into single differential points, each corresponding to one of the items, devices, each common to the items of only one group, and each settable at different points corresponding to the items of its group, card analyzing means for sensing the items on the cards, means controlled by the analyzing means according to the analysis of an item for selecting one of the devices for operation, means also controlled by the analyzing means for setting the selected device at the point corresponding to the analyzed item, and means controlled by the coaction of said member and the selected device upon the member reaching the point of its travel at which the selected device is set for manifesting the analyzed item.

12. In a machine controlled by records having different groups of combinational designations of items; the combination of a member having a range of travel divided into single differential points each corresponding to a different item, devices, each common to the items of only one group, and each settable at different successive points corresponding to the items of its group, card analyzing means for analyzing a card item, means controlled by the analyzing means according to its analysis of a portion of the combinational designation of the item for moving each of the devices to a similar differential point in its own group, means also controlled by the analyzing means but according to the analysis of another portion of the combinational designation of the item for rendering only one of said devices operative at the latter selected point, and recording means controlled by coaction of said member and the selected device at said latter point for recording the analyzed item.

13. In a machine controlled by record cards for bearing a group of item designations; the combination of a commutator device common to the items of said group and having different successive positions, each position corresponding to one of the items of said group, means controlled by one of the items on a card for positioning the commutator device in one of said positions corresponding to the controlling item on the controlling card, a read-out circuit including said commutator device, and a contactor having a timed travel coacting with the commutator device for sensing its position and completing the read-out circuit at a differential point of said travel to thereby read out the timed equivalent of the controlling item.

14. In a machine controlled by record cards bearing combinational designations of items; the combination of a single analyzing brush for sensing the combinational designations of an item, a commutator device, means controlled by the analyzing brush according to its analysis of a card item for reading the combinational designations into the commutator device, and a single contact device for sensing the commutator device and reading out the combinational designations therefrom as a single impulse in a selected circuit.

15. In a machine controlled by record cards bearing combinational designations of items; the combination of analyzing means for sensing the combinational designations of an item on a card, a commutator device, means controlled by the analyzing means for differentially positioning the commutator device according to a portion of the combinational designations of the item, means controlled by the analyzing means for supplementing the position of the commutator device by reading into it the other portion of the combinational designations, a read-out device coacting with the commutator device according to control of the latter by said second-named means and according to its position for reading out the combinational designations by means of a selected circuit as a single impulse, and mechanism controlled by the said impulse for operation according to the analyzed item.

16. In a machine controlled by record cards bearing combinational designations of items; the combination of a single analyzing brush for sensing the combinational designations of an item on a card, a commutator device, means controlled by the analyzing brush according to its analysis of the item for reading the combinational designations into the commutator device, a single feeler coacting with the commutator device to read out the combinational designations as a single impulse in a selected circuit, and printing means controlled by the circuit for printing the item.

17. In a machine controlled by record cards bearing combinational designations of alphabetical items; the combination of analyzing means for sensing the combinational designations of an alphabetical item on a card, a commutator device, means controlled by the analyzing means according to its analysis of the alphabetical item for entering the combinational designations into the commutator device, a single feeler for traversing the commutator to read out the combinational designations as a single impulse in a selected circuit, and printing means synchronized with the travel of said feeler and controlled by said circuit for printing the alphabetical item while in motion.

18. In a machine controlled by record cards bearing combinational designations of items; the combination of a contact spot, means for analyzing the combinational designation of an item on a card, means controlled by the analyzing means for differentially positioning the spot according to the analysis of a portion of the combinational designations of the item, means governed by the other portion of the combinational designation for placing the contact spot in a read-out circuit, and means having a single-timed differential travel for sensing the contact spot at a single differential point of its travel for completing the read-out circuit.

19. In a machine controlled by record cards bearing item designations; the combination of analyzing means for sensing the card designations; a pair of coacting commutator members movable along a common arcuate locus to coact with each other at different points of said locus, means controlled by the analyzing means according to its analysis of a designation for moving said members relatively to each other along said locus to vary the point at which they coact, an electrical circuit selectively controlled by the coaction of the members, and mechanism controlled by the circuit for operation according to the point of coaction of the members.

20. In a machine controlled by record cards having item designations; the combination of analyzing means for sensing the item designations of the cards, a member having an uninterrupted and continuous path of travel including differentially successive points, each corresponding to an item, a second member movable along a part of said path through a range including a plurality of said points, means controlled by the analyzing means according to its analysis of a designation for moving the second member to one of the points of its range to be encountered at the latter point by the first-mentioned member during the travel of the latter, and recording means controlled by the encounter of the members to record the item corresponding to the common point at which the members encounter each other.

21. In a machine controlled by record cards bearing groups of items; the combination of a member movable along a circular path including an arcuate range divided into successive spaced apart groups of points, each group corresponding to one of the item groups and the points of each group corresponding to the items in the group, a plurality of group members, each spaced apart along said arcuate range according to the spacing of the groups of points and each movable along said range to occupy the different points of one such group, analyzing means for sensing the items of the cards, means controlled by the analyzing means according to its analysis of a card item for commonly moving the group members to similar points of their respective group of points, means also controlled by the analyzing means according to its analysis of the latter card item for causing the first member during its movement along said arcuate range to effectively coact with only one of said group members when it reaches the point to which the latter has been moved and means controlled by the coaction of the first member and the latter group member for reading out the equivalent of the analyzed card item.

22. In a machine controlled by record cards bearing item designations; the combination of means for analyzing the designations of the cards, a pair of members movable along the same path through successive points, each corresponding to one of the designations, means controlled by the analyzing means for causing the members to coact with each other at one of said points, an electrical circuit set up by the coaction of said members at said point, and selectively operating mechanism controlled by the circuit according to the point of coaction of said members.

23. In a machine controlled by record cards having item designations; the combination of analyzing means for sensing the item designations of the cards, a pair of members movable along the same, common, path through successive differential points corresponding to the different designations, the members being arranged to coact at only one of such points, means controlled by the analyzing means according to its analysis of a designation for moving one of said members to a corresponding point of coaction with the other member, and mechanism controlled for selective operation by the coaction of said members and in accordance with the point at which they coact.

24. In a machine controlled by record cards bearing item designations; the combination of analyzing means for sensing the item designations of the cards, a pair of members movable along a common path through successive points each corresponding to an item designation, means controlled by the analyzing means according to its analysis of an item designation for selectively causing the members to coact with each other at one of said points, and recording means controlled by the coaction of the members for recording the item corresponding to the analyzed designation.

25. In a machine controlled by record cards having item designations; the combination of analyzing means for sensing the item designations of the cards, a pair of members movable along a common arcuate path through successive points, each corresponding to an item, means controlled by the analyzing means for selectively causing the members to coact with each other at one of said points, and recording means controlled by the coaction of the members for recording the item corresponding to the point of their coaction.

26. In a machine controlled by record cards having items designated by combinational group and inter-group characteristics; the combination of analyzing means for sensing the cards to analyze the several characteristics of an item, a set of contact elements corresponding to intergroup characteristics and settable under control of the analyzing means according to analysis of the intergroup characteristic of the analyzed item; a second set of contact elements corresponding to the group characteristics and settable under control of the analyzing means according to the group characteristic of the analyzed item, a circuit controlled by the combination of the group and intergroup settings of the first and second set of contact elements for converting the combinational characteristics of the item into a singly characterized equivalent, and means controlled by the circuit for manifesting the aforesaid equivalent.

27. In a machine controlled by record cards having items designated by combinational group and intergroup characteristics; the combination of means for analyzing the several characteristics of a card item, a set of contacts commonly settable under control of the analyzing means according to analysis of an intergroup characteristic of an analyzed item, a second set of contacts and a device for selecting one of the latter under control of the analyzing means according to a group characteristic of the analyzed item, a circuit connection between the latter selected contact and one of the contacts of the first-mentioned set, a feeler for differentially coacting with the latter contact in accordance with its setting, and a read-out circuit formed by coaction of the feeler with the latter contact for converting the combinational characteristics of the analyzed item into a single characterized equivalent.

28. In a machine controlled by record cards bearing items designated by combinational group and intergroup characteristics; the combination of means for analyzing the cards to sense the several characteristics of the items, a commutator settable under control of the an analyzing means according to intergroup characteristics of the analyzed items, a separate commutator separately settable under control of the analyzing means according to group characteristics of the analyzed items, and a read-out circuit controlled by the combination of settings of the two commutators for converting the combinationally characterized items into singly characterized equivalents.

29. In a machine controlled by record cards bearing items designated by group and intergroup characteristics, each characteristic allocated to a different field of the card; the combination of means for analyzing the cards in motion to sense the characteristics of the items, a device movable, during a certain period, in synchronism with the analysis of the intergroup field of a card, means controlled by the analysis of the intergroup characteristic of an item for arresting the movement of the device to set it in a position corresponding to said intergroup characteristic, a second device movement of which is synchronous with analysis of the group field, means controlled by analysis of a group characteristic of the item for arresting the second device in a position corresponding to the group characteristic, a circuit for reading out the positions of both devices as a singly characterized equivalent, and recording means controlled by said circuit to record the item.

30. In a machine controlled by record cards bearing items designated by combinational group and inter-group characteristics of an item; the combination of a pair of separate devices, an analyzer for analyzing the cards for group characteristics, means including a magnet for operating one of the devices according to the group characteristic and means including a magnet for operating the other device according to the intergroup characteristic of an item, a common circuit for energizing both magnets controlled by the analyzing means when it senses either group or intergroup characteristics of an item, means for selectively rendering only one of the magnets effective at one time to control the operation of the associated device, and recording means controlled by the combined operation of both devices for recording the item.

31. In a machine controlled by record cards bearing item designations; the combination of an analyzer for sensing successive cards for designations, a single magnet energized under control of the analyzer upon the sensing of designations in either of the successive cards, a pair of separately movable devices for translating the designations of alternate cards, a pair of separate control instrumentalities, each for coacting with and governing of operation of one of said translating devices and means for operating said instrumentalities under control of the aforesaid magnet to be effective one at a time for governing operation of their respective translating devices in accordance with the analysis of alternate cards.

32. In a machine controlled by record cards bearing items designated by combination group and intergroup perforations; the combination of an analyzer for sensing the several perforations of an item to make a group and intergroup analysis of the item, circuit set up by the analyzer upon its sensing either the group or intergroup perforations of the item, a pair of magnets in series in said circuit, a pair of translating devices, each controlled by one of said magnets, means for operating one of said devices under control of its magnet according to the group analysis of an item, means for operating the other device under control of its magnet according to the intergroup analysis of the item, and means controlled by the combined operation of both devices for translating the group and intergroup analysis into an equivalent single designation.

33. In a machine controlled by records bearing combination designations of items; the combination of translating means for converting the combinational designations of an item into equivalent single designation readings, cyclically operated card-controlled means for reading all the combinational designations of an item into the translating means, cyclically operated means for reading out of the translating means the equivalent of the combinational designations of the item, the cycles of said means overlapping each other, and recording mechanism controlled by the reading out means to record the item.

34. In a machine controlled by record cards having group and intergroup fields, one for bearing a group characteristic and the other an intergroup characteristic, both characteristics combining to designate a single item; the combination of means for analyzing each of the cards once and while the card is in motion to sense the combinational characteristics of an item, and means for converting the combinational characteristics into a single equivalent characteristic comprising a device movable in synchronism with the analysis by said analyzing means of the intergroup field, a second device movable in synchronism with analysis by said analyzing means of the group field, and a circuit controlled by both devices including electrical connections selected by both devices under control of aforesaid analyzing means and in accordance with the analysis by said analyzing means of the item characteristics in both fields for reading out the singly characterized equivalent of the analyzed item.

35. In a machine controlled by record cards bearing combinational group and intergroup index point designations of items, each such card having several intergroup index point positions and several group index point positions; the combination of a device having successive positions of displacement along a line of travel, each such position corresponding to a group index point position of a card, a second device having successive positions of displacement along a line of travel, each of which corresponds to an intergroup index point position of a card, each combination of group and intergroup positions of displacement representing a single point equivalent, electrical means for reading out the combination of the positions of both devices as a single point equivalent, and card analyzing means for sensing the item designations of each card once to determine the combination of group and intergroup positions of the devices to be read out by said electrical means.

36. In a machine controlled by record cards bearing group and intergroups index point designations of item, each such card having several intergroup index point positions and several group index point positions; the combination of a pair of devices, one having successive points of displacement corresponding to the group index point position and the other having successive points of displacement corresponding to the intergroup index point positions, means for analyzing the cards for item designations, means controlled by the analyzing means for setting the devices at their respective points corresponding to the index point positions of the analyzed item, means coacting with the devices subsequent to their both being set for reading out the combination of points at which they are set as an equivalent single point, and recording means controlled by said reading-out means to make a record corresponding to said single point equivalent.

EUGENE A. FORD.